United States Patent Office 3,442,854
Patented May 6, 1969

3,442,854
QUATERNARY AMMONIUM PHOSPHONIUM AND ARSONIUM CATALYSTS FOR THE PRODUCTION OF POLYCARBONATES BY THE TRANSESTERIFICATION METHOD
Ulrich Curtius and Ludwig Bottenbruch, Krefeld-Bockum, and Hermann Schnell, Krefeld-Uerdingen, Germany, assignors to Farbenfabriken Bayer Aktiengesellschaft, Leverkusen, Germany, a corporation of Germany
No Drawing. Filed Jan. 20, 1966, Ser. No. 521,808
Claims priority, application Germany, Jan. 21, 1965, F 45,012
Int. Cl. C08g 17/003, 17/13
U.S. Cl. 260—47       10 Claims

ABSTRACT OF THE DISCLOSURE

A process for the production of thermoplastic polycarbonates by the transesterification method in which salts of quaternary ammonium, phosphonium or arsonium bases are employed as the transesterification catalyst.

---

The present invention relates to high molecular weight thermoplastic polycarbonates, particularly to the preparation of high molecular weight thermoplastic polycarbonates and more particularly to the preparation of thermoplastic polycarbonates by transesterification.

It has been known heretofore that polycarbonates could be prepared by the transesterification process with the aid of known transesterification catalysts. Conventionally a dihydroxydiaryl compound and a diaryl carbonate are reacted in the presence of a catalyst. The catalyst for the reaction is employed in order to economically obtain satisfactory molecular weights. Pursuant to this objective the catalyst should exhibit various characteristics. It should have good activity so that high molecular weights may be obtained within a short period of time. It should be substantially stable to the reactants and reaction products under the reaction conditions. Also it is desirable if the catalyst employed be utilizable in reasonably small quantities. In addition, it should not increase the color of the polycarbonate nor its sensitivity to atmospheric oxygen, particularly at elevated temperatures. The prior art conventionally employed metals of the 1st and 2nd main groups of the Periodic Table of Elements and their oxides, alcoholates and phenolates, as well as salts of these metals with weak acids, such as e.g. sodium acetate, potassium carbonate, calcium propionate, potassium diphenyl phosphate and the like, as well as compounds of zinc, lead, cadmium, manganese, antimony and titanium, such as cadmium acetate, manganese carbonate, lead oxide, zinc borate and titanium tetrabutylate. All of these compounds have certain disadvantages, such as, for example, manganese carbonate is insoluble in polycarbonate and brings about a clouding of the inherently clear melt. In addition, other metal compounds such as, manganese salts and lead salts, increase the sensitivity to atmospheric oxygen so that molded articles obtained from a polycarbonate produced with these salts gradually become brown in the air, especially at an elevated temperature.

Other catalysts such as the salts of metals of the 2nd subsidiary group of the Periodic Table of Elements require very long reaction times and are thus unsatisfactory as transesterification catalysts. Compounds, such as titanium even with the exclusion of atmospheric oxygen produce dark yellow-colored melts. In addition, some of these catalysts promote undesired side reactions in the transesterification process. Thus, at the high reaction temperatures, rearrangement of the polymer molecules often takes place which leads to branchings and thus results in a deterioration of the mechanical properties of the molded articles produced from the product. It is also known that the thermoplastic working up of polycarbonates which have been produced by the transesterification process, is only satisfactory if the material to be worked up has been dried until the water content is below about 0.01%. In the absence of a drying step, a reduction of the molecular weight occurs during melting, which materially reduces the desirable mechanical properties of the molded products. Also, these catalysts accelerate the hydrolytic decomposition of the polymers when extruded and molded in the presence of a small amount of moisture. Another disadvantage of these catalysts, especially in the presence of basic catalysts is the formation of a high thermal stress such as may occur in injection molding processing machines, which can result in bubble formation and strong discoloration.

It has, therefore, already been proposed to neutralize the basic catalysts at the end of the reaction by the addition of volatile, acid-acting substances or to stabilize the polycarbonates against the moisture sensitivity by compounds of phosphorus or of boron. The addition of antioxidants for preventing damage by atmospheric oxygen is also known. All these attempts to improve the stability of the polycarbonates has resulted in a reduction in the desirable mechanical properties and has necessitated an additional process step during production.

Therefore, it is an object of this invention to provide polycarbonates having desirable chemical, physical and electrical properties. It is another object of this invention to provide polycarbonates having good resistance to heat and exhibit outstanding resistance to thermal degradation in oxidative environments. It is still another object of this invention to provide a method of preparing high molecular weight polycarbonates. It is still another object of this invention to provide a method of preparing polycarbonates by utilizing catalysts which have excellent activity so that high molecular weight products may be obtained within a short period of time. It is a further object of this invention to provide a method of preparing polycarbonates by utilizing catalysts which are substantially stable under conditions of the reactions and which are utilizable in small amounts and still enable the attainment of high molecular weight products within a short period of time. It is still a further object of this invention to provide a method of preparing high molecular weight polycarbonates by utilizing catalysts which do not promote discoloration and thermal decomposition of the polycarbonates even at elevated temperatures.

The foregoing objects and others which will become apparent from the following description are accomplished in accordance with this invention, generally speaking, by preparing polycarbonates from the transesterification process, wherein a dihydroxy compound is reacted with an organic carbonate in the presence of salts of quaternary ammonium, phosphonium or arsonium bases.

In other words, we have found that polycarbonates can be prepared from the transesterification process which are substantially free of discoloration and thermal decomposition at elevated temperatures by utilizing salts of quaternary ammonium, phosphonium or arsonium bases as transesterification catalysts.

The transesterification catalysts may be represented by the formula

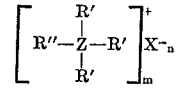

wherein R′ and R″ which may be the same or different represent hydrocarbon radicals linked to Z, Z represents a nitrogen, phosphonium or arsonium atom and X represents an anion linked to the Z atom through an electrovalent bond, and $m$ and $n$ are integers of from 1 to 2. R' represents alkyl radicals having from 1 to 10 carbon atoms such as, for example, methyl, ethyl, propyl, butyl, pentyl, hexyl, octyl, and decyl; and aryl radicals such as phenyl and naphthyl. R" may be the same as R' or may be an alkylene radical having from 1 to 6 carbon atoms, such as methylene, propylene, butylene and hexylene. In the above formula X represents tetraaryl borohydride, bromide, phenolate and diaryl phosphate.

Due to the fact that these transesterifiction catalysts are readily obtainable and have great stability, the salts of the above mentioned quaternary bases with a tetraaryl borohydric acid have proved to be especially desirable. These can be precipitated, for example, from an aqueous solution of a quaternary ammonium, phosphonium or arsonium compound by the addition of sodium tetraphenyl borohydride. Where it is desirable to have complete separation of the salts, a non-dissolving solvent may be added.

Other sodium tetraaryl borohydrides are also suitable for this purpose. In addition to these tetraaryl borohydrides, other salts of quaternary bases, e.g. their bromides, phenolates or diaryl phosphates may be used. Examples of suitable salts of quaternary bases which may be employed are tetramethyl ammonium tetraphenyl borohydride,
tetrabutyl ammonium tetraphenyl borohydride,
trimethylene-bis-(trimethylammonium)-bis-tetraphenyl borohydride,
hexamethylene-bis-(cyclohexylmethyl ammonium)-tetraphenyl borohydride,
trimethylene-bis(cyclohexyl dimethyl ammonium)-tetraphenyl borohydride,
tetramethyl phosphonium tetraphenyl borohydride,
tetraphenyl phosphonium bromide,
tetraphenyl phosphonium tetraphenyl borohydride,
tetracresyl phosphonium tetraphenyl borohydride,
tetraphenyl phosphonium phenolate,
tetra-(p-tert.-butylphenyl)-phosphonium diphenyl phosphate,
triphenyl butyl phosphonium phenolate,
triphenyl-butyl-phosphonium tetraphenylborohydride, the bis-tetraphenyl-phosphonium salt of 4,4'-dihydroxydiphenyl propane, ethylene-bis(triphenyl-phosphonium) dibromide, trimethylene - bis-(triphenyl-phosphonium)-bis-tetraphenyl borohydride, tetraphenyl arsonium bromide, tetraphenyl arsonium tetraphenyl borohydride, and so forth.

The amount of these catalysts is not critical and can be varied over a wide range. Even with excessive amounts, practically no damage to the polymers occurs. The desirable amounts are essentially determined by the purity of the starting materials used for the production of the polycarbonates and generally lie between about 0.0001 to about 0.1 mol percent, preferably between about 0.001 to 0.01 mol percent, based on the dihydroxy compounds. It is also possible to use two or more of these transesterification catalysts together or in combination with other known transesterification catalysts.

A method of preparing these polycarbonates according to the invention comprises heating an organic carbonate of the formula

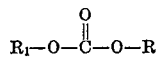

and an organic dihydroxy compound of the formula

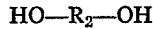

wherein R and $R_1$ which may be the same or different and may be substituted or unsubstituted are selected from the group consisting of alkyl, alkylene, aryl, arylene and cycloaliphatic radicals, and $R_2$ which may be substituted or unsubstituted is selected from the group consisting of alkylene, alkylidene, arylene and (diarylene)-alkane in an inert atmosphere in the presence of a transesterification catalyst described above at a temperature or from about 150 to about 350° C. As the reaction progresses it is preferred that the pressure be reduced and the resultant monohydroxy compound be distilled from the reaction mixture. In addition, it is recommended, especially in the final stage of the reaction, to reduce the pressure to about 1 mm. Hg or less until the melt has reached the desired viscosity.

Substituents which may be substituted on R, $R_1$ and $R_2$ above are inorganic atoms, inorganic radicals and organic radicals which are inert to and uneffected by the reactants and by the reaction of the organic carbonate and organic dihydroxy compounds. The number of substituents may range from 0 to a maximum determined by the number of replaceable hydrogens on the organic groups. Examples of alkyl radicals having from 1 to 15 carbon atoms are methyl, ethyl, propyl, isopropyl, hexyl, decyl, octyl, decyl, dodecyl, tetradecyl and the like; aryl radicals such as phenyl, naphthyl, biphenyl, tolyl, xylyl, ethyl phenyl, butyl phenyl and the like; cycloalphatic radicals such as cyclopentyl, cyclohexyl and the like; alkylene and alkylidene radicals such as methylene, ethylene, propylene, hexylene, decylene, dodecylene, propylidene, isopropylidene, butylidene, isobutylidene, amylidene, isoamylidene, hexylidene, octylidene and the like; arylene radicals such as phenylene, naphthylene, biphenylene, tolylene, xylylene and the like.

Examples of inert substituents are for example nitro groups, halogens, such as, chlorine, bromine, fluorine and iodine, and organoxy radicals such as methoxy, ethoxy, propoxy, butoxy, phenoxy and the like.

In general, the polycarbonates can be prepared by the interaction between the reactants at a temperature of from about 150° C. to about 350° C. or higher for times varying from about 1 to 20 hours, preferably from about 1 to 10 hours at atmospheric pressures, subatmospheric or superatmospheric pressures. It is preferred that the reaction be conducted in the presence of a non-oxidizing or inert atmosphere such as, hydrogen, nitrogen, krypton, neon and the like to prevent undesirable oxidative effects, especially where extremely high reaction temperatures are employed. It is preferred that the reaction be conducted under such conditions that as the ester interchange occurs, the organic hydroxy compound is removed from the reaction mixture. Heating under vacuum after the ester interchange is substantially complete, for example, at from 150 to 300° C. at 0.01 to 5-10 mm. for extended periods of time tends to increase the molecular weight and viscosity of the polycarbonate.

Although equimolar ratios of the organic dihydroxy compound and organic carbonate or excesses of either reactant can be used to make these polycarbonates, an excess of from 3 to 10 percent of the organic carbonate is preferred since products of higher molecular weights and viscosities can be more easily obtained with excess organic carbonates. Molar excesses of the organic dihydroxy compound can also be employed, especially when the dihydroxy compound is more volatile than the organic carbonate.

Examples of organic carbonates which may be employed are the carbonic acid esters such as diphenyl carbonate, dicresyl carbonate, bis-(4-chloro-phenyl)carbonate, the bis-phenyl carbonate hydroquinone, of resorcinol, of 4,4'-dihydroxy-diphenyl, the bis-phenyl carbonates of the bis-(4-hydroxy-aryl)-alkanes, -cycloalkanes, -esthers, -sulphides, -sulphones and the like, as well as the appropriate diethyl or dicyclohexyl esters.

Examples of aromatic dihydroxy compounds which may be used alone or in admixture for the synthesis of high molecular weight polycarbonates, are hydroquinone, resorcinol, pyrocathechol, 4,4'-dihydroxydiphenyl, 2,4 - dihydroxy-diphenyl, bis - (4 - hydroxy-aryl)-alkanes, such as 2,2 - (4,4' - dihydroxy - diphenyl) - propane; bis - (4-hydroxy-aryl)-cycloalkanes, such as 1,1-(4,4' - dihydroxy-diphenyl)-cyclohexane and 1,1-(4,4'-dihydroxy-diphenyl) - cyclododecane; 1,4 - dihydroxy naphthalene, 1,2-dihydroxy - naphthalene, bis - (4 - hydroxy-aryl) - sulphides, ethers, sulphones, sulphoxides, 5,5 - (4,4' - dihydroxydiphenyl) - hexahydro - 4,7 - methanoindane, 2,2 - (4,4'-dihydroxy - diphenyl) - norbornan, $\alpha,\alpha,\alpha',\alpha'$-tetramethyl-$\alpha,\alpha'$ - bis - (4 - hydroxy - phenyl) - p - xylene, 2,2 - bis-(3,5-dichloro - 4 - hydroxy - phenyl) - propane and the like.

Examples of aliphatic and cycloaliphatic dihydroxy compounds are ethylene glycol, diethylene glycol, triethylene glycol, polyethylene glycol, thiodiglycol, ethylene dithioglycol, propanediol-1,2 and the di- and poly-glycols prepared from propylene oxide-1,2, propanediol-1,3, butanediol - 1,3, butanediol-1,4,2-methyl propanediol-1,3, pentanediol - 1,5, hexanediol - 1,6, octanediol - 1,8, decanediol - 1,10, cyclohexanediol - 1,2, 2,2 - (4,4' - dihydroxy dicyclohexyl)-propane and 2,6-dihydroxy decahydronaphthalene. Other dihydroxy compounds are p-xylene glycol, 1,4 - bis - (hydroxy methyl)cyclohexane, bis-alkoxylated bis - phenylol-alkanes, bis - alkoxylated bisphenylol-cycloalkanes and the like.

In the formation of co-polycarbonates, a mixture of dihydroxy compounds such as the aliphatic and cycloaliphatic dihydroxy compounds can be used, concurrently with the aromatic dihydroxy compounds.

Polycarbonates obtained from the reaction of organic dihydroxy compounds and organic carbonates in the presence of the catalysts of this invention exhibit a number of advantages when compared over the products obtained by the known processes as illustrated in Table 1.

ing, casting and extruding. They also can be employed as bonding material for metallic or fibrous laminates.

The invention is further illustrated by the following examples in which all parts are by weight unless otherwise specified.

EXAMPLE 1

(a) Comparative example

Approximately 7000 parts of bisphenol A, about 6700 parts of diphenyl carbonate and about 0.01 part of disodium bis-phenolate are melted at a temperature between about 140 and 160° C., under nitrogen, in a stainless steel autoclave having a capacity of about 25 parts by volume and provided with an agitator and distillation device. The resultant phenol is distilled off, with stirring, at pressure of about 100 mm. Hg at a temperature between about 180 and 230° C. over a period of about 140 minutes. The distillate consists, at this time, of about 5300 parts phenol, which contains about 0.06 percent by weight of diphenyl carbonate. After about 15 minutes the pressure is reduced to about 0.5 mm. Hg and the reaction completed at a temperature between about 290 and 305° C. During this time, an additional 525 parts of phenol are distilled off. After about 250 minutes, a clear, pale yellow melt of polycarbonate is obtained. One part is extruded as bristle under nitrogen pressure from the base valve of the autoclave. The product has a relative viscosity of 1.301, measured in a solution of 0.5 part by weight in 100 parts by volume methylene chloride at 25° C.

TABLE 1

| Product acc. to Example | Catalyst | Rel. Visc. | Color No.[1] result after 5 hrs. at 300° C. under $N_2$ | Result | | Tensile test according to DIN 53,455 after 5 hrs. 300° C. under $N_2$ | | | | Test sample, 12 hours at 130° C. tempered | | |
|---|---|---|---|---|---|---|---|---|---|---|---|---|
| | | | | $\delta$St., b.p./cm.$^{-2}$ | $\delta$Br., b.p./cm.$^{-2}$ | $\epsilon$Br., percent | $\delta$St., b.p./cm.$^{-2}$ | $\delta$Br., b.p./cm.$^{-2}$ | $\epsilon$Br., percent | $\delta$St., b.p./cm.$^{-2}$ | $\delta$Br., b.p./cm.$^{-2}$ | $\epsilon$Br., percent |
| 1 | Na-Bisph | 1,301 | 1 | 2.5 | | 605 | 650 | 110 | 610 | 645 | 71 | 710 | 645 | 83 |
| 2 | Phosphonium salt | 1,305 | 0.6 | 0.8 | | 610 | 680 | 120 | 610 | 675 | 122 | 740 | 725 | 121 |

[1] Color Nos.—0=water-clear; 0.5=almost water-clear, slightly yellowish; 1=pale yellowish; 2=yellow; 3=dark yellow.
NOTE.—$\delta$St.=tensile stress at stretching limit; $\delta$Br.=tensile stress at breaking point; $\epsilon$Br.=elongation at breaking point.

Surprisingly, the color of the material is weaker and remains so even after a prolonged residence time at a high temperature. In addition, the mechanical properties are better than those of comparable products which have been prepared, for example, with alkaline catalysts, as illustrated by the values in the drawing test according to DIN 53,455. In addition, the effect of moisture on the polycarbonate material in the melt formation is substantially reduced when using the catalysts of this invention as illustrated in Table II.

The other part of the melt is allowed to stand in the autoclave for 5 hours at 300° C. under nitrogen and then extruded. The relative viscosity is about 1.303 and the color has darkened to an amber-colored yellow.

(b) Process according to the invention

A polycarbonate melt is produced in the same apparatus, under the same reaction conditions and with the same reactants described above in (a), with the exception that 0.09 part of trimethylene-bis-(triphenyl-phospho-

TABLE II

| Product acc. to Example | Catalyst | Rel. Vis. Granulate | Test sample after dry working up | Test sample after working up with 0.2% $H_2O$ | Notch impact strength according to DIN 53,453 | |
|---|---|---|---|---|---|---|
| | | | | | Test sample after dry working up cm., b.p./cm.$^2$ | Test sample after working up with 0.2%, $H_2O$ c.m. b.p./cm.$^2$ |
| 1 | Na-Bisph | 1,301 | 1,297 | 1,225 | [1] 50.3 | [2] 21.2 |
| 3 | Phosphonium salt | 1,303 | 1,300 | 1,271 | [1] 52.6 | [1] 48.1 |

[1] Slightly broken.
[2] Broken.

It can readily be seen from the table that the polycarbonate material thus formed is considerably more stable to moisture and has improved mechanical properties when compared with material produced according to the known processes.

The polycarbonates of the present invention are characterized by high molecular weight, exceptional thermal stability and excellent physical and chemical properties. These polycarbonates can be mixed with dyes, delusterants, pigments, plasticizers, reinforcing materials and with other polymers. They are easily fabricated into useful articles such as films, fibers, sheets, tubes, rods and the like from a melt by conventional shaping techniques such as moldnium)-bis-tetraphenyl borohydride is substituted for the disodium bis-phenolate as the catalyst. The desired viscosity of the melt is reached after stirring for about 280 minutes in a high vacuum at a temperature between about 290 and 300° C.; the melt is almost colorless and has a relative viscosity of about 1.305. A part of the melt is, as above, allowed to stand for 5 hours at 300° C. under nitrogen pressure. The relative viscosity is then about 1.306 and the change in color is so slight that it must be observed in layers of several centimeters in thickness in order to detect any color change.

EXAMPLE 2

A polycarbonate melt is produced under the same reaction conditions and with the same amount of reactants as in Example 1(a) except that about 0.3 part of tetraphenyl phosphonium tetraphenyl borohydride is substituted for disodium bis-phenolate as the catalyst. The distillation of the phenol commerces at a melt temperature of about 166° C. and a pressure of about 100 mm. Hg. As above described about 5300 parts of phenol are distilled off after about 125 minutes. After about 15 minutes the vacuum is increased to about 0.5 mm. Hg and the reaction completed at a temperature of between about 290 and 305° C. During this time, an additional 570 parts of phenol are distilled off. After about 270 minutes, an almost colorless melt of polycarbonate is obtained.

One part is extruded as bristle from the autoclave base valve. The product has a relative viscosity of about 1.303 and can be worked up by the usual methods to give shaped articles. The other part of the melt is allowed to stand under nitrogen for 5 hours at a temperature of about 300° C. After this time, it is substantially colorless.

One part of the synthetic resin granulate obtained by comminution of the extruded bristle is worked up after drying in a vacuum at about 120° C., the other part is worked up, after standing for 48 hours at a relative atmospheric humidity of about 50% (water take-up 0.20%.), to test specimens in an injection molding machine. The results of the mechanical testing are illustrated in Table II.

EXAMPLE 3

Approximately 7000 parts of bisphenol A, about 6770 parts of diphenyl carbonate and about 0.1 part of tetraphenyl phosphonium diphenyl phosphate are polycondensed in accordance with the procedure described in Example 1. After about 150 minutes distillation time at about 100 mm. Hg, about 5500 parts of phenol are obtained. As in Example 1, the pressure is subsequently reduced to about 0.5 mm. Hg and the temperature increased to between about 290 and 300° C. After an additional 280 minutes, an almost colorless, clear polycarbonate melt is obtained which is extruded as bristle from the autoclave under nitrogen pressure. The relative viscosity of the product is about 1.325.

EXAMPLE 4

About 7000 parts of bisphenol A, about 6700 parts of diphenyl carbonate, about 0.09 part of tetraphenyl phosphonium bromide and about 0.09 part of tetraphenyl phosphonium phenolate are polycondensed in accordance with the procedure described in Example 1. After a total reaction time of about 450 minutes, about 5850 parts of phenol are obtained which contain about 1.6 percent by weight of diphenyl carbonate. The product is almost water-clear melt and has a relative viscosity of 1.320.

EXAMPLE 5

Approximately 6300 parts of bisphenol A, about 614 parts of dihydroxy-diphenyl-methane, about 6700 parts of diphenyl carbonate and about 0.1 part of triphenyl butyl phosphonium tetraphenyl borohydride are polycondensed in accordance with the procedure described in Example 1. A very bright melt of a polycarbonate with a relative viscosity of 1.310 is obtained.

EXAMPLE 6

Approximately 7,000 parts of bisphenol A, about 6,850 parts of diphenyl carbonate and about 0.3 part of tetramethylammonium tetraphenyl borohydride are polycondensed in accordance with the procedure described in Example 1. After a reaction time of about 160 minutes at a temperature between about 170 and 240° C., about 5350 parts of phenol are obtained as distillate. After reducing the pressure to 0.5 mm. Hg and increasing the temperature to between about 290 and 300° C., about 0.01 part of potassium diphenyl phosphate are added and, after about 180 minutes, an additional 660 parts of phenol are distilled off. The melt having reached the desired viscosity is then extruded as bristle from the autoclave under nitrogen. The relative viscosity is about 1.325.

EXAMPLE 7

In a flask of Jena glass having a capacity of 100 parts by volume equipped with a stirrer of stainless steel and vacuum-tight distillation device, there are melted, in an atmosphere of nitrogen, by heating in an oil bath about 22.8 parts of bisphenol A, about 22.7 parts of diphenyl carbonate and about 0.002 part of tetramethyl phosphonium tetraphenyl borohydride. The resultant phenol is subsequently distilled off at a pressure of about 100 mm. Hg, with stirring, and the oil bath temperature is increased every 15 minutes by about 10° C. At about 250° C. the pressure is reduced to about 10 mm. Hg and at 280° C. to about 0.2 mm. Hg. The temperature is thereafter increased to about 300° C. and the reaction completed in about 90 minutes. An almost colorless polycarbonate melt having a relative viscosity of 1.302 is obtained.

EXAMPLE 8

In accordance with the procedure described in Example 7, an almost colorless polycarbonate melt is obtained with approximately the same amount of reactants; however, 0.005 part of tetraphenyl arsonium tetraphenyl borohydride are substituted for the tetramethyl phosphonium tetraphenyl borohydride catalyst. The reaction time in a high vacuum amounts to about 110 minutes, the relative viscosity of the product is 1.307. The melt does not change its color even after 3 hours at about 300° C. under nitrogen.

EXAMPLE 9

In accordance with the procedure described in Example 7, a polycarbonate condensation is carried out with approximately the same amount of reactants except that about 0.003 part of trimethylene-bis-(trimethyl ammonium)-bis-tetraphenyl borohydride is substituted for tetramethyl phosphonium tetraphenyl borohydride as the transesterification catalyst. After distilling off the bulk of the phenol at about 100 mm. Hg while slowly increasing the temperature from about 190 to 250° C. and subsequently reducing the pressure to 0.2 mm. Hg, the desired viscosity is reached after a reaction time of about 95 minutes at an oil bath temperature of about 300° C. The product is an almost colorless melt having a relative viscosity of about 1.302.

EXAMPLE 10

In accordance with the procedure described in Example 7 a polycarbonate is produced from the following reactants: Approximately 22.8 parts of bisphenol A, about 30.0 parts of di-o-chlorophenyl carbonate, about 0.002 part of tetramethyl phosphonium tetraphenyl borohydride.

The reaction time in the high vacuum stage is about 105 minutes and the relative viscosity of the resultant polycarbonate is about 1.310. The product forms an almost colorless melt.

EXAMPLE 11

In accordance with the procedure described in Example 7, a polycarbonate is produced from the following reactants: Approximately 20.5 parts of bisphenol A, about 2.7 parts of bisphenol Z (1,1-(4,4'-dihydroxy-diphenyl)-cyclohexane), about 22.4 parts of diphenyl carbonate and about 0.004 part of tetraphenyl phosphonium tetraphenyl bromanate.

The reaction time in the high vacuum is about 105 minutes. A pale yellowish, clear melt of the polycarbonate is obtained which does not darken, even after three hours' tempering at a temperature of about 300° C. under nitrogen. The relative viscosity of the polycarbonate is about 1.301.

Although the invention has been described in consider-

What is claimed is:
1. A method of preparing high molecular weight thermoplastic polycarbonates which comprises reacting an organic carbonate and an organic dihydroxy compound at elevated temperatures under ester exchange conditions in the presence of a catalytic amount of a tetraaryl borohydride, bromide, phenolate or diaryl phosphate salt of a member selected from the group consisting of quaternary ammonium, phosphonium and arsonium bases.

2. The method of claim 1 wherein the organic carbonate has the formula

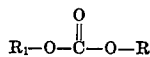

wherein R and $R_1$ are selected from the group consisting of alkyl, alkylene, aryl, arylene and cycoaliphatic radicals.

3. The method of claim 1 wherein the organic dihydroxy compounds has the formula $$HO-R_2-OH$$

wherein $R_2$ is selected from the group consisting of alkylene, alkylidene, arylene and (diarylene) alkane radicals.

4. The method of claim 1 wherein the catalyst has the formula

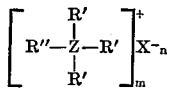

wherein R' is selected from the group consisting of alkyl and aryl radicals having from 1 to 10 carbon atoms, R" is selected from the group consisting of alkyl, alkylene and aryl radicals, Z is selected from the group consisting of nitrogen, phosphonium and arsonium atoms, and X is an anion selected from the group consisting of tetraaryl borohydride, bromide, phenolate and diaryl phosphate and $m$ and $n$ are integers of from 1 to 2.

5. The method of claim 1 wherein the catalyst has the formula

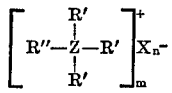

wherein R' is selected from the group consisting of alkyl and aryl radicals having from 1 to 10 carbon atoms, R" is an alkylene group having from 1 to 6 carbon atoms, Z is selected from the group consisting of nitrogen, phosphonium and arsonium atoms and X is an anion selected from the group consisting of tetraaryl borohydride, bromide, phenolate and diaryl phosphate and $m$ and $n$ are integers each equal to 2.

6. The method of claim 1 wherein the catalyst has the formula

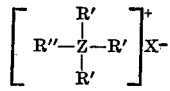

wherein R' and R" are selected from the group consisting of alkyl and aryl radicals having from 1 to 10 carbon atoms, Z is selected from the group consisting of nitrogen, phosphonium and arsonium atoms and X is an anion selected from the group consisting of tetraaryl borohydride, bromide, phenolate and diaryl phosphate.

7. The method of claim 4 wherein the anion is a tetraaryl borohydride.

8. The method of claim 1 wherein the catalyst is a tetraalkyl ammonium tetraaryl borohydride.

9. The method of claim 1 wherein the catalyst is a tetraaryl arsonium tetraaryl borohydride.

10. The method of claim 1 wherein the organic carbonate and organic dihydroxy compound are heated to a temperature of between 150° C. and 350° C. in the presence of an inert atmosphere.

References Cited

UNITED STATES PATENTS

| | | | |
|---|---|---|---|
| 3,153,008 | 10/1964 | Fox | 260—47 |
| 3,193,529 | 7/1965 | Oxenrider | 260—47 |
| 3,193,530 | 7/1965 | Oxenrider | 260—47 |
| 3,227,681 | 1/1966 | Conix | 260—47 |
| 3,275,601 | 9/1966 | Schnell | 260—47 |

OTHER REFERENCES

Groggins, Unit Processes in Organic Synthesis, McGraw-Hill, New York (1962), p. 618.

SAMUEL H. BLECH, *Primary Examiner.*

P. LIEBERMAN, *Assistant Examiner.*

U.S. Cl. X.R.

260—77.5